(12) United States Patent
Mittal et al.

(10) Patent No.: US 9,565,088 B2
(45) Date of Patent: Feb. 7, 2017

(54) MANAGING BANDWIDTH UTILIZATION IN DIFFERENT MODES BY MONITORING NETWORK METRICS AND ADJUSTING A CURRENT NETWORK DATA RATE

(71) Applicant: CITRIX SYSTEMS, INC., Fort Lauderdale, FL (US)

(72) Inventors: Kimaya Mittal, Santa Barbara, CA (US); Albert Alexandrov, Santa Barbara, CA (US); Sascha Kummel, Dresden (DE); Sunitha Beeram, Mountain View, CA (US); Krishna Ramachandran, Santa Barbara, CA (US)

(73) Assignee: GetGo, Inc., Fort Lauderdale, FL (US)

( * ) Notice: Subject to any disclaimer, the term of this patent is extended or adjusted under 35 U.S.C. 154(b) by 958 days.

(21) Appl. No.: 13/871,696

(22) Filed: Apr. 26, 2013

(65) Prior Publication Data
US 2013/0297819 A1 Nov. 7, 2013

Related U.S. Application Data

(60) Provisional application No. 61/641,196, filed on May 1, 2012.

(51) Int. Cl.
| | |
|---|---|
| G06F 15/16 | (2006.01) |
| G06F 15/173 | (2006.01) |
| H04L 12/26 | (2006.01) |
| H04L 12/911 | (2013.01) |
| H04L 29/06 | (2006.01) |
| H04L 12/919 | (2013.01) |

(52) U.S. Cl.
CPC ......... *H04L 43/0876* (2013.01); *H04L 47/765* (2013.01); *H04L 47/781* (2013.01); *H04L 65/403* (2013.01); *H04L 65/4023* (2013.01); *H04L 65/80* (2013.01); *H04L 47/822* (2013.01)

(58) Field of Classification Search
CPC ... H04L 43/0876; H04L 47/781; H04L 47/822
USPC .................. 709/231–232, 223–226
See application file for complete search history.

(56) References Cited

U.S. PATENT DOCUMENTS

| | | | |
|---|---|---|---|
| 6,680,930 B2 * | 1/2004 | Newberg | ............. H04L 47/822 370/252 |
| 6,876,668 B1 | 4/2005 | Chawla | |

(Continued)

OTHER PUBLICATIONS

International Search Report and the Written Opinion dated Sep. 6, 2013 from Corresponding PCT Application No. PCT/US2013/038509.

*Primary Examiner* — Bharat N Barot
(74) *Attorney, Agent, or Firm* — BainwoodHuang

(57) ABSTRACT

Systems and methods for bandwidth allocation and estimation are disclosed. A computer communicates via multiple active streams, each having a type. The computer determines whether to enable or disable bandwidth management. Upon determining to enable bandwidth management, the computer estimating a total available bandwidth, determines, for each stream, a requested bandwidth, and dynamically allocates a portion of the total available bandwidth among the active streams. Upon determining to disable bandwidth management, the computer foregoes dynamically allocating bandwidth among the streams.

21 Claims, 10 Drawing Sheets

(56) References Cited

U.S. PATENT DOCUMENTS

| | | | |
|---|---|---|---|
| 6,931,011 B2* | 8/2005 | Giacopelli | H04L 47/822 370/395.21 |
| 6,937,566 B1 | 8/2005 | Forsloew | |
| 7,742,406 B1* | 6/2010 | Muppala | H04L 43/0876 370/230 |
| 7,925,756 B1* | 4/2011 | Riddle | H04L 47/522 709/232 |
| 8,010,677 B2* | 8/2011 | Brunson | H04L 47/781 709/224 |
| 2002/0101826 A1* | 8/2002 | Giacopelli | H04L 47/822 370/252 |
| 2003/0191854 A1 | 10/2003 | Hsu et al. | |
| 2004/0062262 A1 | 4/2004 | Venteicher et al. | |
| 2004/0257994 A1 | 12/2004 | Paskett et al. | |
| 2008/0192773 A1* | 8/2008 | Ou | H04L 47/781 370/468 |
| 2009/0154487 A1* | 6/2009 | Ryan | H04L 12/413 370/445 |
| 2014/0059186 A1* | 2/2014 | Omar | H04L 47/822 709/219 |

\* cited by examiner

MANAGING BANDWIDTH UTILIZATION IN DIFFERENT MODES BY MONITORING NETWORK METRICS AND ADJUSTING A CURRENT NETWORK DATA RATE

CROSS REFERENCE TO RELATED APPLICATION

This application claims priority under 35 U.S.C. §119(e) and the benefit of U.S. Provisional Application No. 61/641,196, filed May 1, 2012, and entitled, "Method and Apparatus for Bandwidth Allocation and Estimation," the entire disclosure of which is incorporated herein by reference.

BACKGROUND

Teleconferencing, videoconferencing, and desktop sharing sessions may be used to enable communication among parties in various geographical locations.

SUMMARY

In some aspects, the subject technology relates to a method for managing bandwidth utilization of communication streams. The method includes communicating, at a computing device, via a plurality of active streams in a communication application, each of the plurality of active streams having a type. The method includes determining, based on a type of at least one of the plurality of active streams, whether to enable or disable bandwidth management within the communication application. The method includes, upon determining to enable bandwidth management within the communication application: estimating a total available bandwidth at the computing device, determining, for each of the plurality of active streams, based on the type of each of the plurality of active streams, a requested bandwidth, and dynamically allocating, via the communication application, at least a portion of the total available bandwidth among the plurality of active streams at the computing device based on the requested bandwidth. The method includes upon determining to disable bandwidth management within the communication application: foregoing dynamically allocating, via the communication application, bandwidth among the plurality of active streams at the computing device.

In some aspects, the subject technology relates to a non-transitory machine-readable medium for managing bandwidth utilization. The machine-readable medium stores instructions for monitoring, via a communication application executing at a computing machine connected to a network, one or more network metrics, where the communication application is configured to run in either a normal operation mode or an emergency operation mode. The machine-readable medium stores instructions for estimating a total available bandwidth at the computing machine based on the one or more monitored network metrics. The machine-readable medium stores instructions for running the communication application in the normal operation mode at a first network data rate. The machine-readable medium stores instructions for entering an emergency operation mode based on the one or more monitored network metrics. The machine-readable medium stores instructions for determining, based on a change in the one or more monitored network metrics, that the communication application is able to return to the normal operation mode for communication in a first direction. The machine-readable medium stores instructions for entering the normal operation mode for communication in the first direction. The machine-readable medium stores instructions for running a first network data rate test at the first network data rate. The machine-readable medium stores instructions for, if the first network data rate test is successful: setting a current network data rate in the first direction to the first network data rate. The machine-readable medium stores instructions for if the first network data rate test fails: measuring a goodput rate during the first network data rate test, and running a second network data rate test at the goodput rate. The machine-readable medium stores instructions for, if the second network data rate test is successful: adjusting the current network data rate to the goodput rate. The machine-readable medium stores instructions for if the second network data rate test fails: gradually increasing the current network data rate starting from a network data rate being implemented during the emergency operation mode.

In some aspects, the subject technology relates to a system for managing bandwidth utilization. The system includes one or more processors, a network interface for connecting to a network, and a memory storing instructions. The memory stores instructions for monitoring, via a communication application executing via the one or more processors, one or more network metrics, where the communication application is configured to run in either a normal operation mode or an emergency operation mode. The memory stores instructions for estimating a total available bandwidth in the network based on the one or more monitored network metrics. The memory stores instructions for running the communication application in the normal operation mode at a first network data rate. The memory stores instructions for entering an emergency operation mode based on the one or more monitored network metrics. The memory stores instructions for determining, based on a change in the one or more monitored network metrics, that the communication application is able to return to the normal operation mode for communication in a first direction. The memory stores instructions for entering the normal operation mode for communication in the first direction. The memory stores instructions for running a first network data rate test at the first network data rate. The memory stores instructions for, if the first network data rate test is successful: setting a current network data rate in the first direction to the first network data rate. The memory stores instructions for if the first network data rate test fails: measuring a goodput rate during the first network data rate test, and running a second network data rate test at the goodput rate. The memory stores instructions for if the second network data rate test is successful: adjusting the current network data rate to the goodput rate. The memory stores instructions for, if the second network data rate test fails: gradually increasing the current network data rate starting from a network data rate being implemented during the emergency operation mode.

DETAILED DESCRIPTION

Figure 1A:
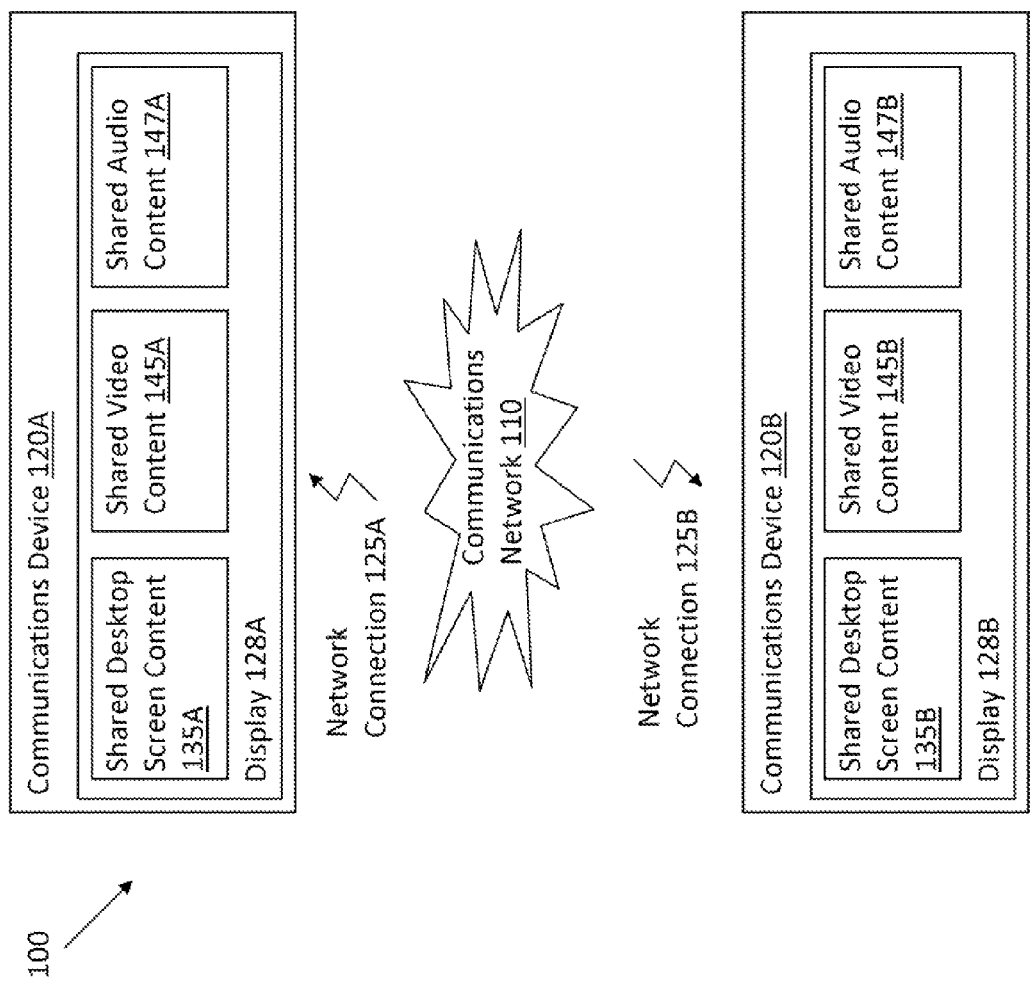
FIG. 1A is a block diagram of an example communications system.

FIG. 1A is a block diagram of a communications system 100 that may be used with embodiments disclosed herein. The communications system 100 includes multiple communications devices 120A/120B that participate in a conferencing session via the communications network 110. In some embodiments, the communications devices 120A/120B may participate in a conferencing session with one another. Although two communications devices are shown, any number of communications devices 120A/120B may participate in the conferencing session. The conferencing session may allow the sharing of desktop screen contents 128A, video 145A, and audio 147A between the communications devices 120A/120B. In some embodiments, the conferencing session allows simultaneous two-way data, audio and video signal transmissions between the communications devices 120A/120B.

The communications devices 120A, 120B may be mobile (e.g., wireless) or non-mobile (e.g., desktop) communications devices with video/audio and desktop screen sharing capabilities. In some embodiments, any communications device that can support real-time peer-to-peer communications and support applications that provide desktop screen sharing sessions and user interaction may be used. Examples of the communications devices 120A/120B that may be used with the embodiments disclosed herein include, but are not limited to, mobile phones, Personal Digital Assistants, portable televisions, laptop computers, digital video/audio recorders, etc.

In some embodiments, one communications device 120A/120B may serve as a host communications device and the remaining communications devices in the system may serve as a client communications device. In some embodiments, the host communications device may be a presenter communications device in a conferencing session and the remaining communications devices may be audience devices in the conferencing session.

Each communications device 120A/120B includes a display 128A/128B for displaying shared desktop screen content 135A/135B, shared video content 145A/145B, and/or shared audio content 147A/147B. In certain embodiments, the display 128A/128B may be a built-in display. In some embodiments, the display 128A/128B may be a separate unit that is coupled (e.g., wirelessly or through a physical connection such as a network connection) with the communications device 120A/120B. The video/audio capabilities of the communications device 120A/120B may be provided by a module built-into the communications device 120A/120B. In certain embodiments, the module that provides the communications device 120A/120B with video/audio capabilities may be an independent unit that is coupled with the communications device 120A/120B.

The communications devices 120A/120B may communicate directly or through intermediary communications devices (not shown). For example, in some embodiments, a communications server (shown in FIG. 1B) may facilitate communications between the communication devices 120A/120B. In some embodiments, the communications devices 120A/120B may communicate through secure and/or encrypted communications links.

The communications network 110 may be a high-bandwidth and/or band-limited communications network. In some embodiments, the communications network 110 may be a wireless communications network. In certain embodiments, the communications network 110 may be a local area network (LAN), metropolitan area network (MAN), or a wide-area network (WAN), such as the Internet. In some embodiments, the network 110 may include one or more segments of one or more general purpose network (e.g., Internet, LAN, etc.) and/or other networks (e.g., Internet protocol (IP) network).

Depending on the type of communications device 120A/120B used (e.g., mobile or desktop), the communications devices 120A, 120B participate in the conferencing session through appropriate communications links 125A/125B (e.g., wireless and/or wired communications links) and through appropriate communication networks 110.

In some embodiments, the available amount of bandwidth at any given time during a conferencing session may be determined. In certain embodiments, a bandwidth estimator (shown later with reference to FIG. 3) may be used to estimate the available amount of bandwidth.

The bandwidth estimator may be positioned within a communications device 120A/120B participating in the conferencing session, downstream relative to the communications network 110, or within the communications network 110. In certain embodiments, the bandwidth estimator may be coupled with a monitoring component (shown later with reference to FIG. 3) that observes various network metrics (e.g., delay, packet loss, etc.) and determines a setting (i.e., mode) in which the bandwidth estimator should operate. The monitoring component may be internal to the bandwidth estimator or positioned external to the bandwidth estimator, for example positioned within the network and/or within the communications device.

In some embodiments, the bandwidth estimator may operate in a normal setting (i.e., normal mode), indicating that the network 110 is in its typical/normal operating conditions. Alternatively, in certain embodiments, the bandwidth estimator may operate in an emergency setting (e.g., abnormal mode), indicating that factors, such as heavy cross traffic, may be altering the normal operating conditions of the network.

In some embodiments, a bandwidth allocator (shown later with reference to FIG. 3) may be used to partition the estimated bandwidth available for the conferencing session among active traffic streams. The active traffic streams may include desktop screen data content 135A/135B and video 145A/145B or audio 147A/147B being shared among the communications devices 120A/120B. In some embodiments, each traffic stream, upon being activated, is registered with the bandwidth allocator. In some embodiments, the traffic stream may specify a minimum bandwidth requirement upon being registered with the bandwidth allocator. The bandwidth allocator allocates bandwidth to each stream while ensuring that the minimum bandwidth required by each stream is met. The sum of all minimum bandwidth levels required by the traffic streams indicates the minimum bandwidth requirement for carrying out the conferencing session.

Figure 1B:
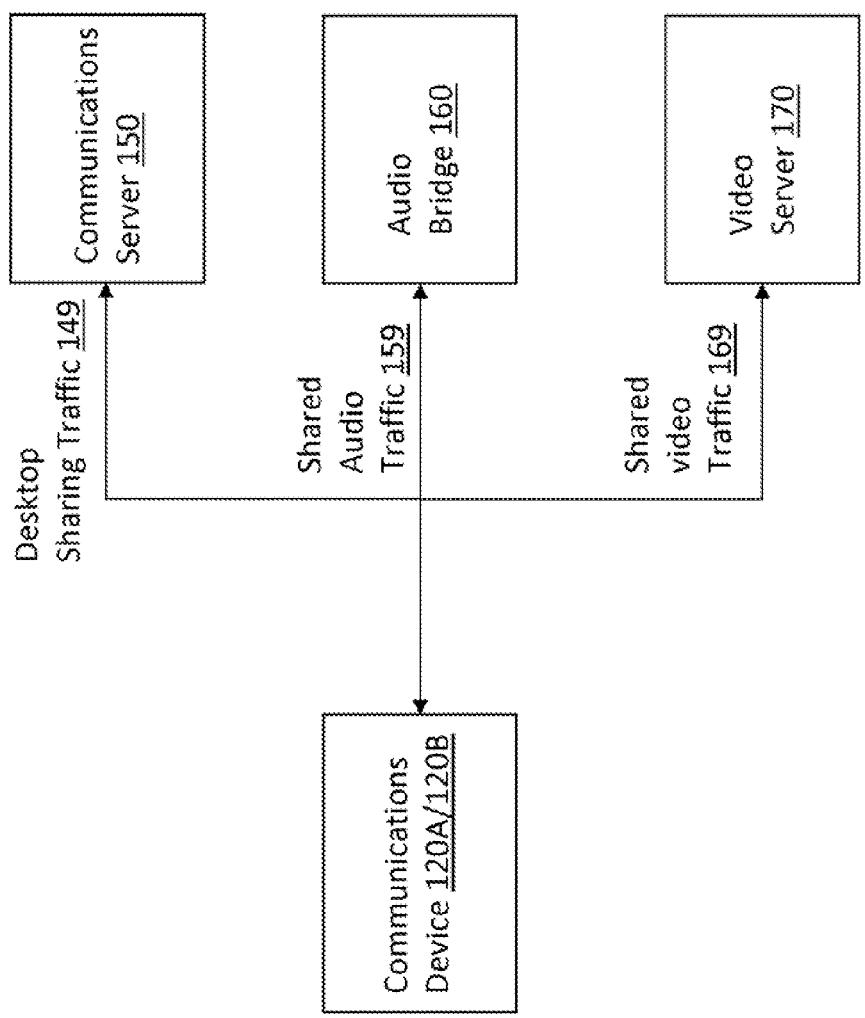
FIG. 1B is a block diagram of an example communications system.

FIG. 1B is a block diagram of a communications system that may be used with the embodiments disclosed herein. In some embodiments, the communications devices 120A/

120B may use one or more communications servers to facilitate communications with one another. For example, as shown in FIG. 1B, in some embodiments, a communications device 120A/120B may connect to a communications server 150 that facilitates transmission of data traffic 149, including shared desktop screen content 135A between the communications devices. In certain embodiments, an audio server 160 (audio bridge 160) may be used to facilitate transmission of audio traffic 159 between the communications devices 120A/120B participating in the conferencing session. Further, in some embodiments, a video server 170 may be used to facilitate transmission of shared video traffic 169 between the communications devices 120A/120B.

The communications server 150, audio bridge 160, and video server 170 may be positioned within the network 110 or be down stream from the network 110.

Figure 2:
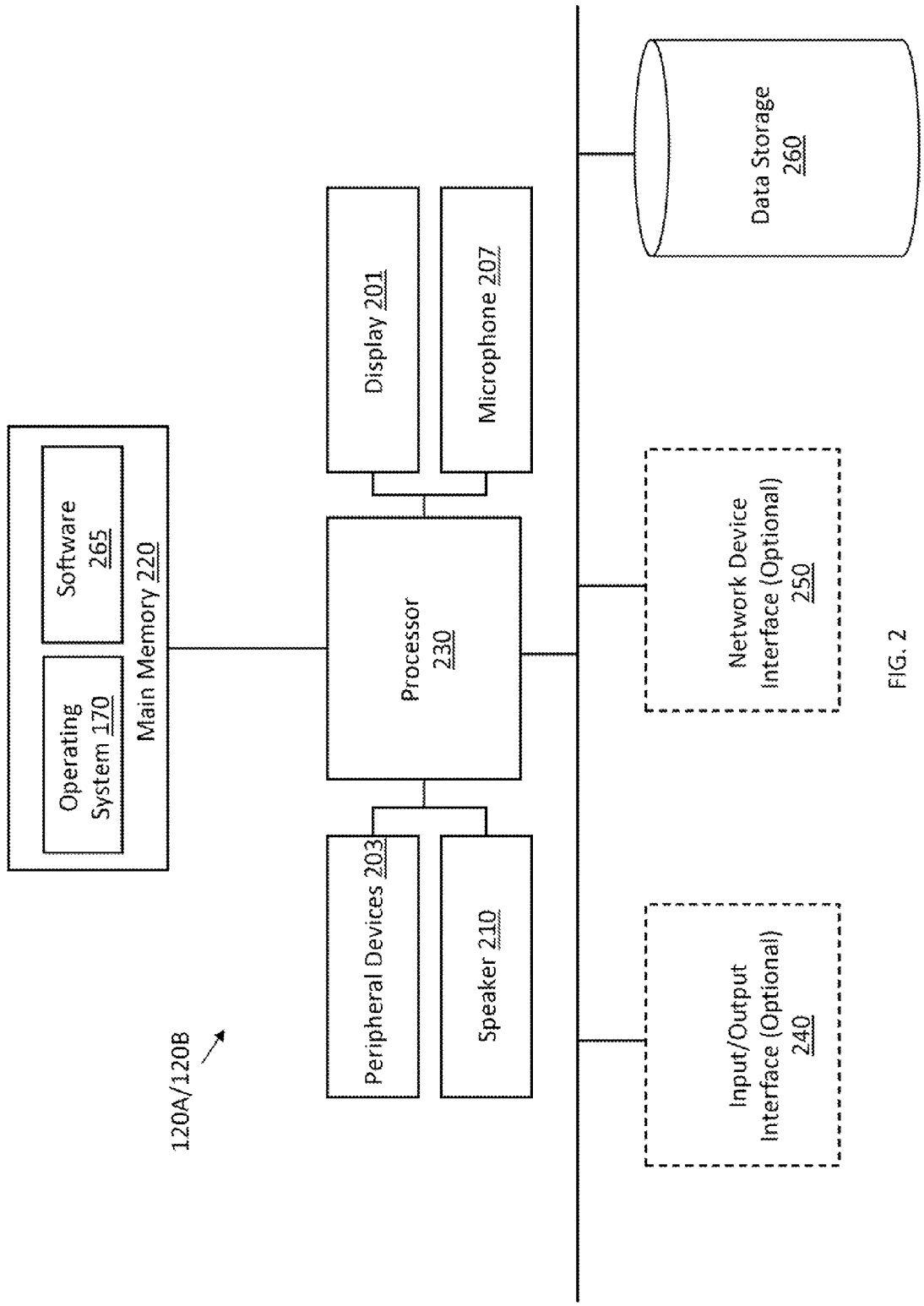
FIG. 2 is a block diagram of an example communications device.

FIG. 2 is a block diagram of a communications device 120A, 120B that may be used with embodiments disclosed herein.

The device 120A/120B may include a processor 230 (e.g., Central Processing Unit or CPU) that carries out the operations of the device, executes various instructions, and manipulates data structures from a main memory 220.

The processor 230 may be coupled to various interfaces via an input/output (I/O) device interface 240. The I/O device interface 240 may include logic to interface with various input and/or output devices, such as a keypad or mouse and with the processor 230, and allow signals to be transferred between the processor 230 and other components. Further, interface devices such as speaker 210, microphone 207, peripheral devices 203, and display 128 may be used to transfer signals to/from the processor 230 and main memory 220. In some embodiments, the input/output interface 240 may include a USB port (not shown).

In some embodiments, the communications device 120A/120B may include a network device interface 250 that provides the device with access to a communications network 110. In some embodiments, an input/output network interface 240 may be used to transmit and receive the signals used for estimating and allocating bandwidth according to the embodiments described herein.

The main memory 220 may be a computer-readable memory and include combinations of non-volatile memory devices. The main memory 220 may also include an operating system 270 that implements various conventional operating system functions including memory management and controlled access to various devices, such as a database storage 260, and task and process scheduling. The data storage 260 may include content, for use with embodiments disclosed herein, such as images, text, video, audio, and computer applications. The main memory 220 may be configured to hold various software 265 and computer-executable instructions and data structures including computer-executable instructions and data structures that implement aspects of the techniques described herein.

For example, in some embodiments, the software 265 may implement the procedures for estimating the available amount of bandwidth for a conferencing session. In some embodiments, the software 270 may further implement the procedures for allocating the estimate bandwidth and partitioning the estimated bandwidth available for the conferencing session among active traffic streams.

As noted previously, alternatively, in some embodiments, an application program (not shown) or a module (not shown) positioned in the network 110 (shown in FIG. 1) may estimate the available amount of bandwidth for the conferencing session and/or partition the estimated bandwidth available for the conferencing session among active traffic streams.

Figure 3:
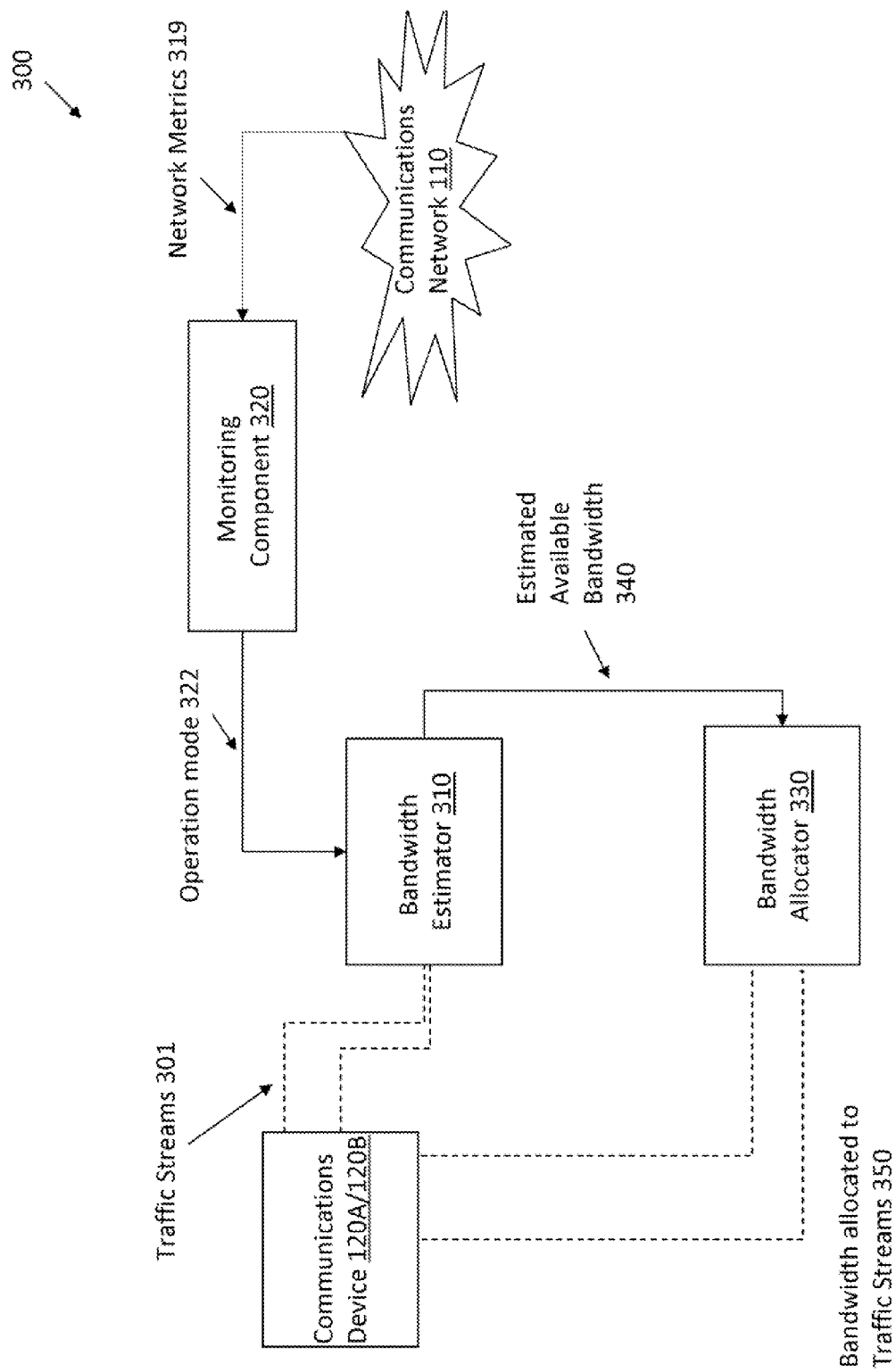
FIG. 3 is a block diagram of an example bandwidth management system.

FIG. 3 is a block diagram of a bandwidth management system 300 according to certain embodiments disclosed herein. The bandwidth management system may include a bandwidth estimator 310 and a bandwidth allocator 330. The bandwidth estimator 310 determines the amount of bandwidth available for traffic streams 301 directed into/out of a communications device 120A/120B. The bandwidth allocator uses the estimated available bandwidth 340 to partition the available bandwidth among the traffic streams 301 and allocate appropriate bandwidth 350 to each traffic stream.

In certain embodiments, at least one of the bandwidth estimator 310, the bandwidth allocator 330, or the monitoring component 320 may be positioned within the communications device 120A/120B. In some embodiments, at least one or a portion of one of the bandwidth estimator 310, the bandwidth allocator 330, or the monitoring component 320 may be located within at least one of the communications network 110, the communications server 150, the audio bridge 160, or the video server 170.

In some embodiments, the bandwidth estimator 310 may operate in a normal setting. The normal setting may be indicative of a network being in its normal operating state (e.g., having expected and typical delay or traffic). In some embodiments, the bandwidth estimator 320 may operate in an emergency setting. The emergency setting may be indicative of the network being in an abnormal state. For example, the emergency setting may be indicative of heavy cross traffic. In certain embodiments, a monitoring component 320 may monitor network metrics 319, such as delay and packet loss in the communications network 110, and determine the setting (i.e., operation mode 322) in which the bandwidth estimator 310 should operate at any given time.

In certain embodiments, the bandwidth estimator 310 may estimate the available amount of bandwidth by periodically monitoring and testing the data rate convoyed into/out of the communications device 120A/120B. In some embodiments, during each date rate test, the data rate is increased (e.g., using bandwidth allocator 330) and any resulting change in network metrics is monitored (e.g., using monitoring component 320) to determine whether the data rate increase is successful.

In certain embodiments, upon transitioning to an emergency setting, the data rate may be reduced (e.g., using bandwidth allocator 330) by a predetermined factor to make room for cross traffic. In certain embodiments, the predetermined factor may be one half. Once the data rate is reduced, no further changes to the data rate are made unless a significant change in network metrics 319 (e.g., heavy packet loss) is observed. In some embodiments, in an event a significant change in network metrics 319 is observed (e.g., heavy packet loss), the data rate may further be reduced.

In certain embodiments, the monitoring component 320 may determine that an emergency setting is no longer in effect. The monitoring component 320 may determine this transition out of the emergency setting in response to return of network metrics 319 to their normal conditions. For example, in some embodiments, the monitoring component 320 may determine the transition out of the emergency setting in response to observing that network metrics 319, such as delay and packet loss, have returned to their normal expected values.

In some embodiments, a "fast recovery" from the emergency setting may be conducted. In some embodiments, the recovery from the emergency setting may be done by attempting a pre-emergency mode rate test (e.g., at a network data rate that existed before the emergency mode was entered), as described above, thereby reducing the recovery time. In some embodiments, in an event the fast-recovery date rate test fails (which may mean that the network 110 has not yet returned to its pre-emergency state), the bandwidth estimator 110 may discover the new available bandwidth through a "slow ramp-up." When using the slow ramp-up to determine available bandwidth, the bandwidth estimator 110 may conduct a number of data rate tests, during each of which, the data rate is increased (e.g., using bandwidth allocator 330) and any resulting change in network metrics is monitored (e.g., using monitoring component 320) to determine whether the data rate increase is successful.

In certain embodiments, in an event the fast-recovery rate test fails, instead of directly falling back to slow ramp-up, a second data rate test may be performed. In some embodiments, the second data rate test may evaluate the performance of the network 100 at a goodput rate, obtained during the failed fast recovery test. The goodput rate, in some embodiments, may indicate the application level throughput or the amount of useful information delivered by the network 110 to/from the communications device 120A/120B. This provides for quick recovery in scenarios where the network 110 has recovered to a certain extent but not to the pre-emergency level.

In some embodiments, active bandwidth management may be done when no video content is being shared among the communications devices 120A/120B and the traffic streams being shared are audio (voice) content and/or screen content 135A/135B. Managing audio (voice) content and/or screen content 135A/135B sessions, in absence of shared video content, provides for controlled screen sharing bursts and removes any interference that may be caused by the audio stream.

Alternatively, in certain embodiments, active bandwidth management may be done when video content is being shared among communications devices 120A/120B in addition to the shared desktop session and/or any shared audio.

Certain embodiments may provide for improved screen sharing performance on low bandwidth connections. Specifically, in certain embodiments, the overall bandwidth utilization may be increased when screen sharing is active. For example, in one embodiment, the overall bandwidth utilization may be increased from 80% to 95% when screen sharing is active. In some embodiments, the bandwidth allocated to a screen sharing session may be increased in the case of a sustained burst. For example, in one embodiment, the bandwidth allocated to a screen sharing session may be increased from 50% to 85%.

In some embodiments, for very low bandwidth connections, a floor may be applied to the screen sharing allocation to grant a screen sharing session 135A/135B more bandwidth than what is available and leave to Transmission Control Protocol (TCP) to provide congestion control with the additional bandwidth allocated to the screen sharing session 135A/135B, resulting in the best possible screen sharing performance. In an event a video content sharing session is active; this granting of additional bandwidth to the screen sharing session may result in reduced quality of the shared video content 145A/145B when the screen sharing burst is active.

As noted above, bandwidth estimator 310 may operate in two settings/modes, namely the normal mode and the emergency mode. In an event one direction of data transmission (downstream or upstream) is in the emergency mode, certain embodiments may prevent performing of data rate tests in the other direction. However, in certain embodiments, an ability to ramp-up may be added to one direction of transmission even when the other direction is in the emergency mode.

As noted above, the bandwidth allocator 330 may partition the available bandwidth (as reported by the bandwidth estimator 310) among the active traffic streams 301 (audio sharing, video sharing 145A/145B, and/or screen sharing 135A/135B).

In some embodiments, upon being activated, each traffic stream 301 may register with the bandwidth allocator 330. As part of its registration profile, each traffic stream 301 may specify a minimum bandwidth requirement. In some embodiments, the minimum bandwidth requirement is guaranteed to be met. The sum of all minimum requirements is the minimum bandwidth requirement for conducting a conferencing session.

In certain embodiments, each traffic stream 301, throughout its lifetime, may express a current bandwidth demand to the bandwidth allocator 330. For example, in one embodiment, a Voice over Internet Protocol (VoIP) audio stream may have a static current demand that may be equal to its minimum requirement. In some embodiments, for the video 145A/145B and screen sharing 145A/145B streams, the demand may change in response to activity levels in each stream 301.

In some embodiments, the bandwidth allocator 330 may operate by initially granting every active stream 301 its minimum requirement. When handling a VoIP stream, no further modification in bandwidth allocation is needed since the demand tends not to increase beyond the minimum requirement.

If any bandwidth remains after the minimum bandwidth requirements have been met, the remaining bandwidth is proportioned between screen sharing and video streams. Specifically, if there is no current screen sharing activity 135A/135B, all the surplus bandwidth may be allocated to a shared video stream 145A/145B. However, if the screen sharing stream 135A/135B has ongoing activity, it is given a portion of the surplus bandwidth, assuming that it has sufficient demand for this. In one embodiment, the allocated portion of the surplus bandwidth may be up to 50% of the surplus bandwidth. The remaining bandwidth is allocated to the video stream 145A/145B.

In some embodiments, the video stream may temporarily adapt to a lower bandwidth grant every time screen sharing becomes active. In some embodiments, in order to distinguish this temporary bandwidth reduction from a more permanent bandwidth reduction, such as when the connection bandwidth itself drops, bandwidth allocation may be done in a short-term or a long-term basis. The long-term allocation may signify the amount of bandwidth the shared video content 145A/145B may get when the screen sharing 135A/135B is inactive. In some embodiments, the video stream may use the long-term bandwidth allocation to configure its codec, etc. In certain embodiments, when the short-term allocation changes (e.g., when screen sharing is active), the video stream may not perform any significant reconfiguration and assume that screen sharing activity is short-lived.

In some embodiments, the short-term/long-term grant may be used to optimize video performance during screen sharing activity.

Since equal partitioning of surplus bandwidth between screen sharing and video streams may result in reduced screen sharing performance, particularly on low bandwidth connections, certain embodiments may increase the surplus bandwidth allocated to a screen sharing session 135A/135B. For example, in one embodiment, the surplus bandwidth allocated to a screen sharing session 135A/135B may be increased from 50% to 85% in case of sustained activity (e.g., activity lasting over 2 seconds).

In some embodiments, in order to obtain the best possible screen sharing performance, a floor metric may be applied to the screen sharing allocation when there is activity, thereby allocating more bandwidth to a screen sharing session than what is available and leaving to TCP to provide congestion control with the additional bandwidth allocated to the screen sharing session. This may result in reduced video quality when the screen sharing session is active.

In some embodiments, a predetermined wait time may be applied when a screen sharing session 135A/135B is active to reduce thrashing between high and low grants when screen sharing is active.

Figure 4:
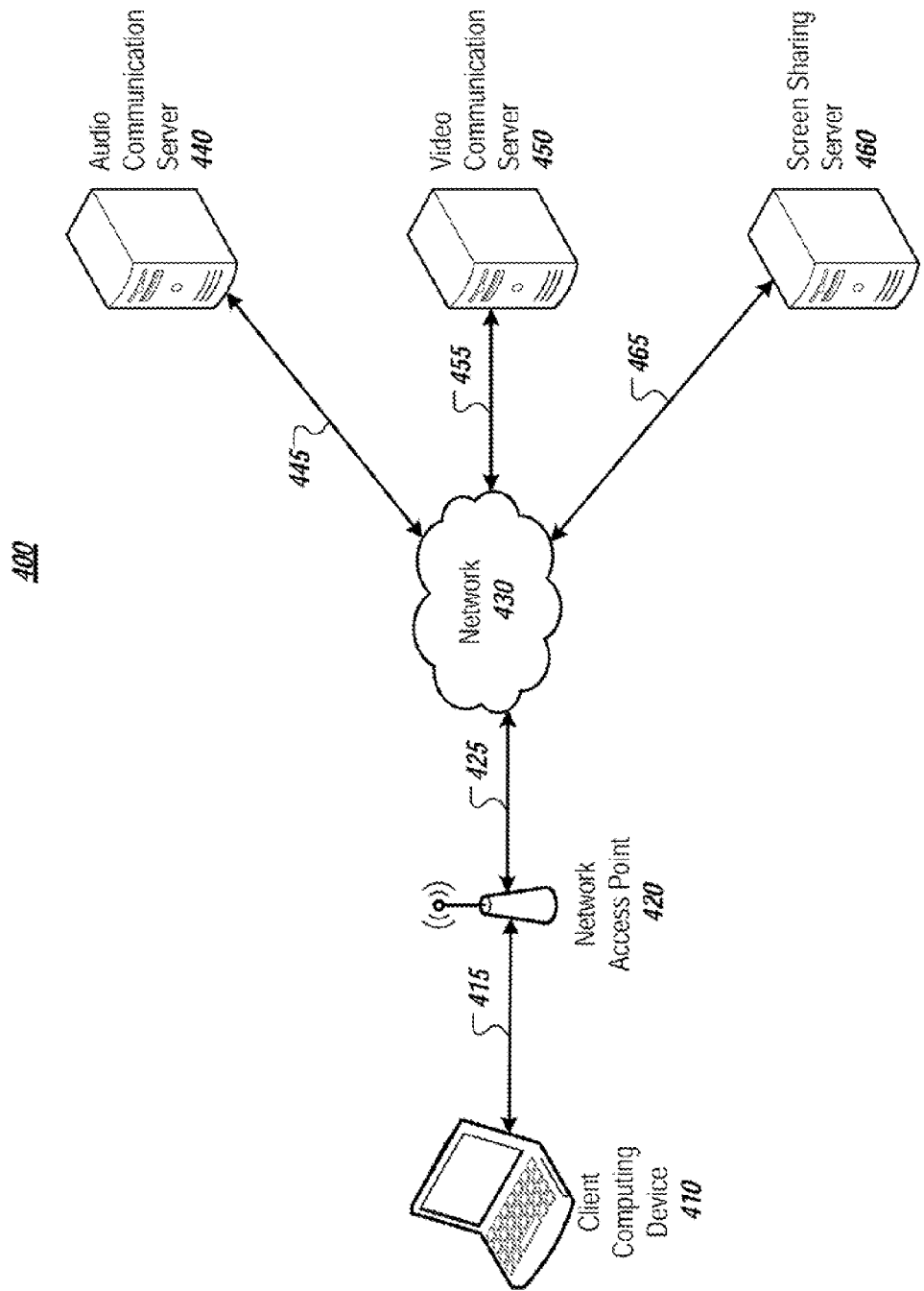
FIG. 4 illustrates an example system for bandwidth allocation and estimation.

FIG. 4 illustrates an example system 400 for bandwidth allocation and estimation. As shown, the system 400 includes a client computing device 410 connected to a network 430 via a network access point 420. The network 430 includes connections to an audio communication server 440, a video communication server 450, and a screen sharing server 460, which are configured to communicate with the client computing device 410 via the network 430.

The client computing device 410 can be a laptop computer, a desktop computer, a tablet computer, a mobile phone, a personal digital assistant (PDA), an electronic music player, etc. The client computing device 410 can store a communication application for conducting a communication session (e.g., an online meeting, a voice call with screen sharing, a video call, etc.). The communication session is conducted over the network 430 in conjunction with one or more of the servers 440, 450, and 460. In some implementations, the communication of the client computing device 410 with the servers 440, 450, or 460 is limited by bandwidth. Oftentimes, the bandwidth limit is due to limited bandwidth in the connection 415 between the client computing device 410 and the network access point 420 or in the connection 425 between the network access point 420 and the network 430. In some examples, the connections 444, 455, and 465 between the servers 440, 450, and 460 and the network 430 are high bandwidth connections with higher bandwidth limits than the connections 415 or 425. As a result, the client computing device 410 can assume that the same, or approximately the same, bandwidth exist between the client computing device 410 and each of the servers 440, 450, and 450. For example, the bandwidth between the client computing device 410 and the server 440 is equal to the bandwidth between the client computing device 410 and the server 450, which is equal to the bandwidth between the client computing device 410 and the server 460. The client computing device 410 is described in more detail in conjunction with FIG. 5, below.

The network access point 420 can include one or more modem(s), router(s) or cellular access point(s) used to connect the client computing device 410 to the network 430. The network 430 can be the Internet, a local area network, a wide area network, a cellular network, an intranet, a virtual private network, etc.

The audio communication server 440 is configured to support audio communication between the client computing device 410 and a remote computing device by providing an audio stream between the client computing device 410 and the remote computing device. The video communication server 450 is configured to support video communication between the client computing device 410 and a remote computing device by providing a video stream between the client computing device 410 and the remote computing device. The screen sharing server 460 is configured to support audio communication between the client computing device 410 and a remote computing device by providing a screen sharing stream between the client computing device 410 and the remote computing device. As illustrated, the audio communication server 440, the video communication server 450, and the screen sharing server 460 are implemented on three separate machines. However, in some examples, two or more of the servers 440, 450, and 460 can be implemented on the same machine. In some examples, the system 400 can lack one or more of the servers 440, 450, or 460 and the subject technology can be implemented without one or more of the servers 440, 450, or 460. In some examples, other communication servers, for example a file download server or a file upload server, can be used in conjunction with the subject technology in addition to or in place of one or more of the servers 440, 450, or 460.

Figure 5:
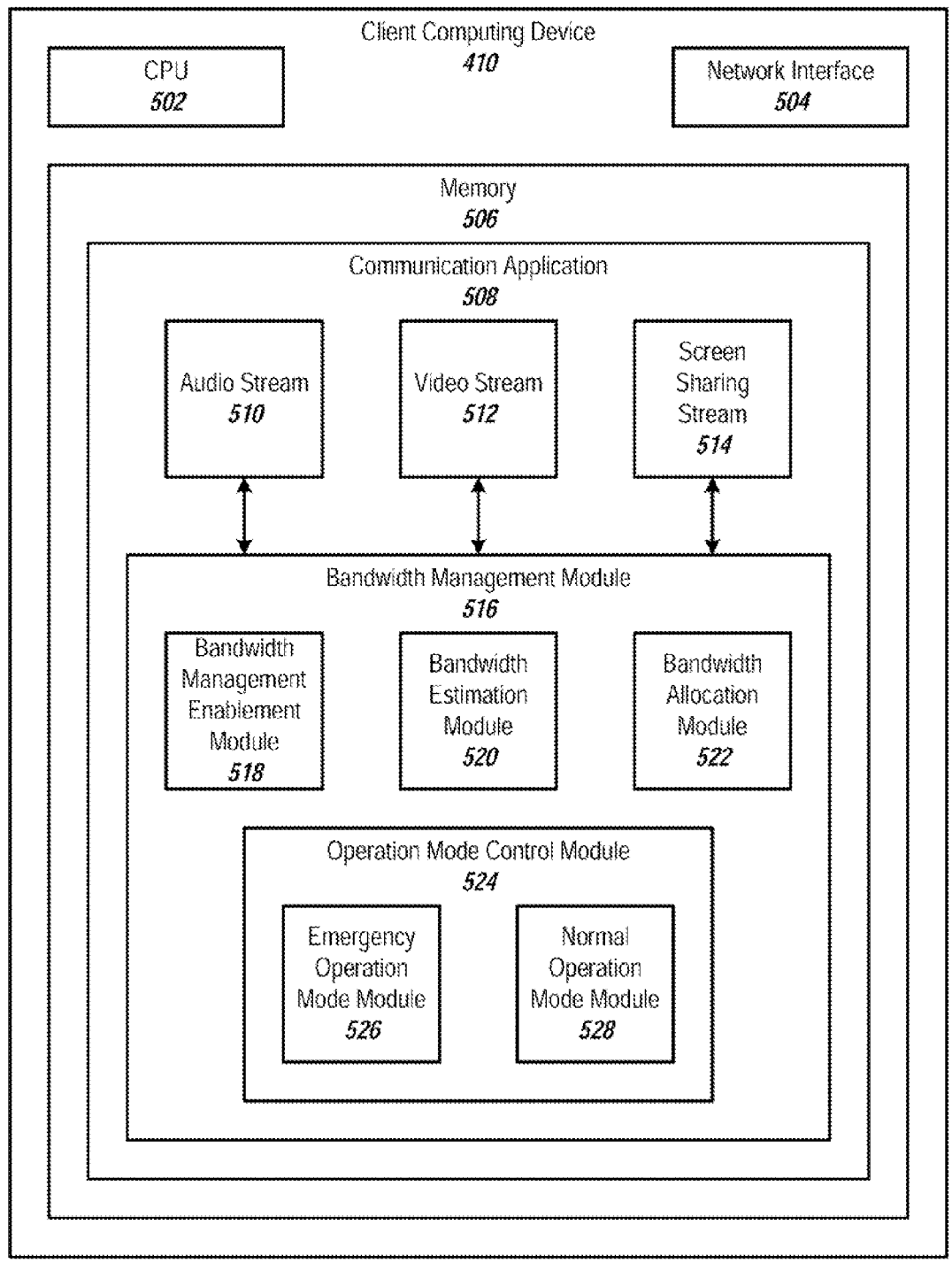
FIG. 5 illustrates an example of the client computing device of FIG. 4.

FIG. 5 illustrates an example of the client computing device 410 of FIG. 4. As shown, the client computing device 410 includes a central processing unit (CPU) 502, a network interface 504, and a memory 506. The CPU 502 includes one or more processors. The CPU 502 is configured to execute computer instructions that are stored in a computer-readable medium, for example, the memory 506. The network interface 504 is configured to allow the client computing device 410 to transmit and receive data in a network, e.g., the network 430. The network interface 504 may include one or more network interface cards (NICs). The memory 506 stores data and/or instructions. The memory 506 may be one or more of a cache unit, a storage unit, an internal memory unit, or an external memory unit. As illustrated, the memory 206 includes a communication application 508.

The communication application 508 is configured to conduct, via the client computing device 410, a communication session with one or more remote computing devices connected to the network 430. The communication session can include an online meeting, a voice call, a video call, a screen sharing session, etc. The communication session may be conducted in conjunction with one or more of the servers 440, 450, or 460. As illustrated, the communication application 508 includes an audio stream 510, a video stream 512, a screen sharing stream 514, and a bandwidth management module 516.

The audio stream 510 can include audio transmissions (e.g., voice transmissions) between the client computing device 410 and the remote computing device(s) involved in the communication session, transmitted in conjunction with the audio communication server 440. The video stream 512 can include video transmissions (e.g., video taken via a camera of the client computing device 410 or the remote computing device) between the client computing device 410 and the remote computing device(s) involved in the communication session, transmitted in conjunction with the video communication server 450. The screen sharing stream 514 can include screen sharing transmissions between the client computing device 410 and the remote computing device(s) involved in the communication session, transmitted in conjunction with the screen sharing server 460. In some implementations, the communication application 508 can have additional streams in addition to those listed above or can lack one or more of the streams 510, 512, or 514 listed above.

The bandwidth management module 516 is configured to manage a bandwidth utilization of the communication application 508, for example, the bandwidth utilization of streams 510, 512, or 514. As shown, the bandwidth management module includes a bandwidth management enablement module 518, a bandwidth estimation module 520, a bandwidth allocation module 522, and an operation mode control module 524.

The bandwidth management enablement module 518 is configured to determine, based on a type of at least one of the active streams (e.g., the audio stream 510 having an audio type, the video stream 512 having a video type, or the screen sharing stream 514 having a screen sharing type), whether to enable or disable bandwidth management. In some examples, bandwidth management is enabled if the video stream 512 is active. In some examples, bandwidth management is disabled if the video stream 512 is inactive. In some examples, the audio stream 510 is active, the screen sharing stream 514 is active, and the video stream 512 is in active, and bandwidth management is disabled. In some examples, all three streams 510, 512, and 514 are active, and bandwidth management is enabled.

The bandwidth estimation module 520 is configured to estimate a total available bandwidth at the client computing device 410. The total available bandwidth is assumed to be limited by the connection 415 of the client computing device 410 to the network access point 420 and/or by the connection 425 of the network access point 420 to the network 430. As a result, the total available bandwidth between the client computing device and each of the servers 440, 450, and 460, is equivalent, and only one of the servers 440, 450, or 460, or a different server, may need to be able to assist the client computing device 410 in estimating the available bandwidth via the bandwidth estimation module 520.

The bandwidth allocation module 522 is configured, in a case where bandwidth management is enabled by the bandwidth management enablement module 518, to determine, for each of the multiple active streams 510, 512, or 514, a minimum requested bandwidth and a desirability for additional bandwidth. This information may be provided to the client computing device 410 by the server(s) 440, 450, or 460. The bandwidth allocation module 522 is configured to dynamically allocate at least a portion (e.g., between 80% and 95% or 100%) of the total available bandwidth among the multiple active streams 510, 512, or 514 at the computing device based on the minimum requested bandwidth and the desirability for additional bandwidth.

According to some examples, the audio stream 510 has a minimum requested bandwidth and no desirability for additional bandwidth, as audio is transmitted at a roughly constant rate and quality. The video stream 512 has a minimum requested bandwidth and a large, roughly constant, desirability for additional bandwidth, as video quality can be improved with greater bandwidth. The screen sharing stream 514 has a minimum requested bandwidth and a variable desirability for additional bandwidth, as the screen sharing stream 514 may transmit a large amount of data when a screen display that is being shared changes and relatively little data at other times.

In a case where bandwidth management is disabled by the bandwidth management enablement module 518, the client computing device 410 may forego dynamically allocating bandwidth among the multiple active streams 510, 512, or 514 at the client computing device 410.

The operation mode control module 524 is configured to alternate between a normal operation mode, as defined by a normal operation mode module 528 within the operation mode control module 524, and an emergency mode, as defined by an emergency operation mode module 526 within the operation mode control module 524. The operation mode control module 524 is configured to monitor a packet loss rate and/or a packet delay rate in the network 430. If the packet loss rate is above a packet loss threshold or the packet delay rate is above a packet delay threshold, the operation mode control module 524 may enter an emergency mode by invoking the emergency operation mode module 526. Otherwise, the operation mode control module 526 may enter or remain in a normal mode by invoking the normal operation mode module 528.

The emergency operation mode module 526, when invoked, places the communication application 508 of the client computing device 410 into the emergency operation mode. The emergency operation mode module 526 sets the network data rate to a network data rate corresponding to the emergency operation mode. The emergency operation mode module 526 causes the communication application 508 of the client computing device 410 to ignore packet delay in transmissions. The emergency operation mode module 526 causes the communication application 508 of the client computing device 410, upon detecting a packet loss rate above a predetermined amount of packet loss, to further decrease the operating network data rate from the network data rate corresponding to the emergency operation mode.

The normal operation mode module 528, when invoked, places the communication application 508 of the client computing device 410 into the normal operation mode. The normal operation mode module 528 runs a network data rate test at a network data rate exceeding a current operating network data rate. If the network data rate test at the network data rate exceeding the current operating network data rate is successful, the normal operation mode module 528 increases the current operating network data rate.

Figure 6:
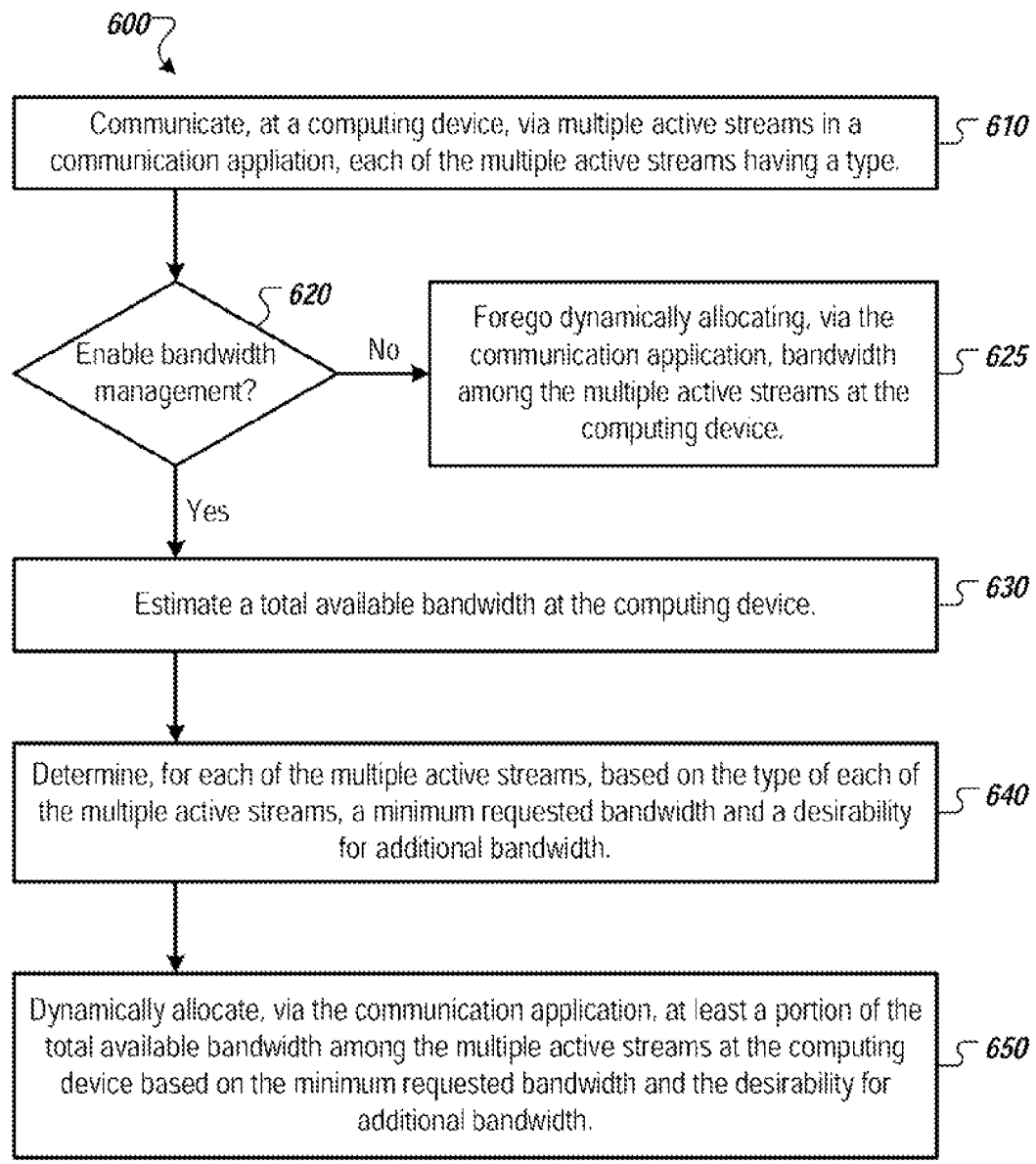
FIG. 6 illustrates an example process for managing bandwidth utilization of communication streams.

FIG. 6 illustrates an example process 600 for managing bandwidth utilization of communication streams.

The process 600 begins at step 610, where a computing device (e.g., client computing device 410 via operation of the communication application 508) communicates (e.g., transmits or receives data) via multiple active streams (e.g., streams 510, 512, or 514). Each of the multiple active streams has a type (e.g., audio, video, screen sharing, file downloading, file uploading, etc.). The type of each of the multiple active stream is characterized by one or more of (i) fixed or variable bandwidth demand, (ii) a priority level, (iii) busty or smooth traffic, and (iv) a maximum requested bandwidth value. For example, an audio type stream has a fixed bandwidth demand, a high priority level, smooth traffic, and a low maximum requested bandwidth value. A video type stream has a variable bandwidth demand, a low priority level (possibly less important than audio or screen sharing), bursty traffic, and a high maximum requested bandwidth value. A screen sharing type stream has a variable bandwidth demand, a high priority level, bursty traffic, and a high maximum requested bandwidth value.

In step 620, the computing device determines, based on a type of at least one of the multiple active streams, whether to enable or disable bandwidth management within the communication application. For example, the computing device can determine to enable bandwidth management within the communication application if a video stream (or another stream having variable bandwidth demand and a high maximum requested bandwidth value) is active and disable bandwidth management within the communication application otherwise. If bandwidth management is disabled in the communication application, bandwidth can still be managed externally to the communication application, for example, via an operating system of the computing device or via the network. If the determination is to enable bandwidth management, the process 600 continues to step 630. If the determination is to disable bandwidth management, the process 600 continues to step 625.

In step 625, upon determining to disable bandwidth management within the communication application, the computing device foregoes dynamically allocating, via the communication application, bandwidth among the multiple actives streams at the computing device. After step 625, the process 600 ends.

In step 630, upon determining to enable bandwidth management within the communication application, the computing device estimates a total available bandwidth at the computing device. In some examples, the computing device computes an upstream and a downstream bandwidth between the computing device and a first server (e.g., one of the servers 440, 450, or 460) based on a data transmission between the computing device and the first server. The computing device estimates an upstream and a downstream bandwidth between the computing device and a second server (e.g., another one of the servers 440, 450, or 460) based on the computed upstream or downstream bandwidth between the computing device and the first server. The upstream and downstream bandwidth between the computing device and the first server can be equivalent to those between the computing device and the second server.

In step 640, the computing device determines, for each of the multiple active streams, based on the type of each of the multiple active streams, a minimum requested bandwidth and a desirability for additional bandwidth. In some cases, a stream is associated with a server, and the server provides the minimum requested bandwidth and the desirability for additional bandwidth. For example, the audio stream 510 is associated with the audio communication server 440; the video stream 512 is associated with the video communication server 450; and the screen sharing stream is associated with the screen sharing server 460. In some cases, the communication application (e.g., communication application 508) stores the minimum requested bandwidth and the desirability for additional bandwidth of each stream that is used by the communication application.

In step 650, the computing device dynamically allocates, via the communication application, at least a portion of the total available bandwidth (estimated in step 630) among the multiple active streams at the computing device based on the minimum requested bandwidth and the desirability for additional bandwidth. According to some examples, the computing device assigns at least the minimum requested bandwidth to each of the multiple active streams. The computing device determines a remaining bandwidth based on the difference between the portion of the total available bandwidth and the sum of the minimum requested bandwidths for the multiple active streams. The computing device dynamically allocates the remaining bandwidth based on the desirability for additional bandwidth and a user experience optimization based on the type of at least one of the multiple active streams. In some examples, the active streams include an audio stream, a video stream, and a screen sharing stream. The remaining bandwidth is dynamically allocated between the video stream and the screen sharing stream, and none of the remaining bandwidth is assigned to the audio stream, which only uses the minimum requested bandwidth of the audio stream. For example, 50% of the remaining bandwidth is assigned to the video stream and 50% of the remaining bandwidth is assigned to the screen sharing stream. In some examples, if the computing device determines that screen sharing activity persists for a threshold time period (e.g., two seconds), the computing device increases the allocation of the remaining bandwidth to the active screen sharing stream and decreases the allocation of the remaining bandwidth to the active video stream responsive to the screen sharing activity persisting for the threshold time period. For example, the screen sharing stream can be assigned 85% of the remaining bandwidth and the video stream can be assigned 15% of the remaining bandwidth. After step 650, the process 600 ends.

Figure 7A:
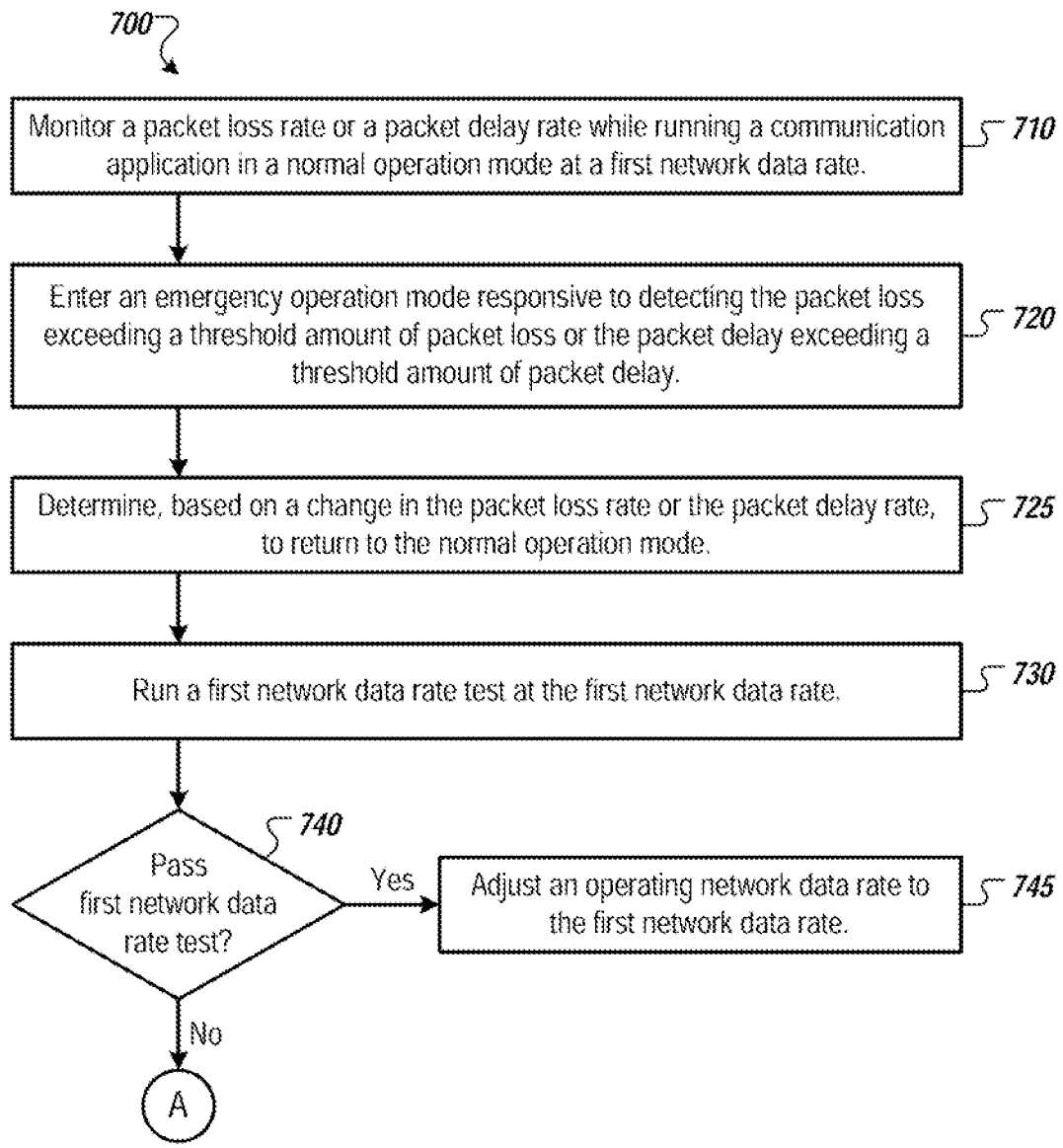
FIGS. 7A-7B illustrate an example process for managing bandwidth utilization.
Figure 7B:
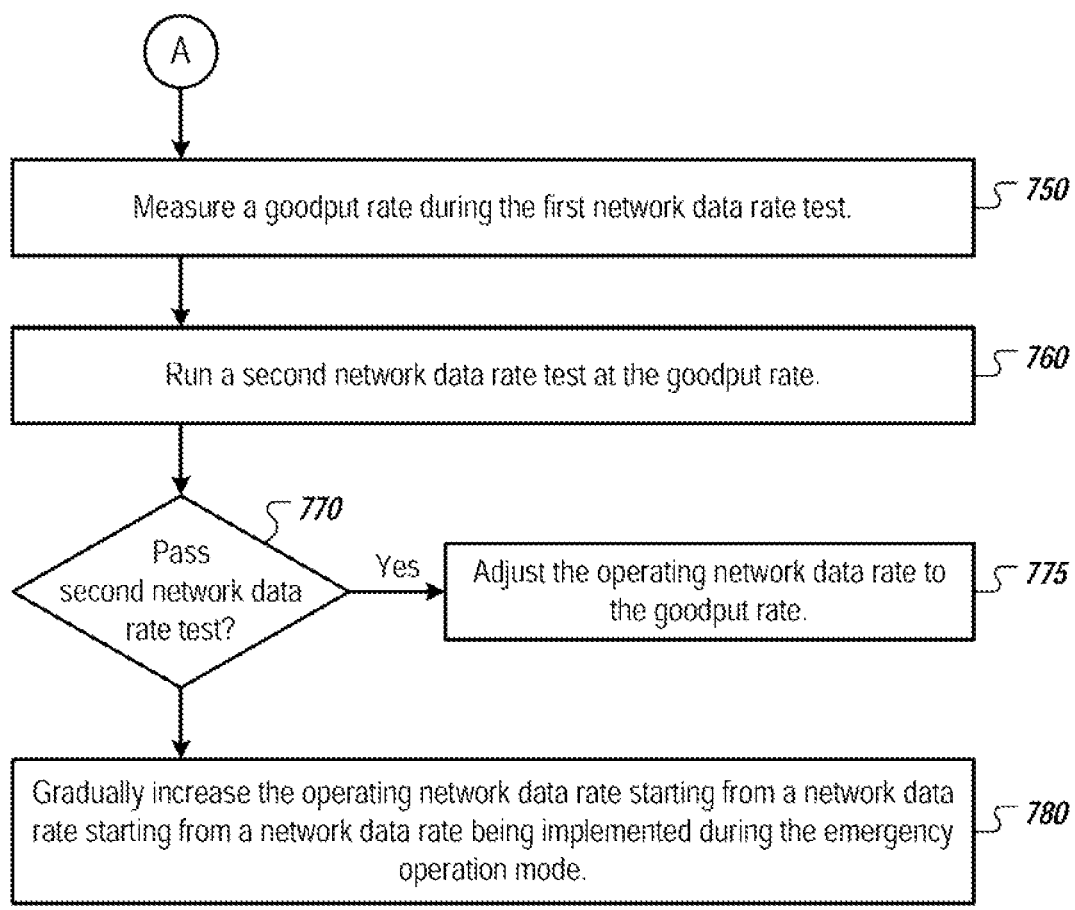

FIGS. 7A-7B illustrates an example process 700 for managing bandwidth utilization.

As shown in FIG. 7A, the process 700 begins at step 710, where a computing device (e.g., client computing device 410) monitors a packet loss rate or a packet delay rate while running a communication application (e.g., communication application 508) in a normal operation mode (e.g., using normal operation mode module 528) at a first network data rate.

In step 720, the computing device enters an emergency operation mode (e.g., using the emergency operation mode module 526) responsive to detecting the packet loss exceeding a threshold amount of packet loss or the packet delay exceeding a threshold amount of packet delay.

In step 725, the computing device determines, based on a change in the packet loss rate or the packet delay rate, to return to the normal operation mode. The computing device then returns to the normal operation mode (e.g., using the normal operation mode module 528).

In step 730, the computing device (e.g., using the operation mode control module 524) runs a first network data rate test at a first network data rate.

In step 740, the computing device determines whether the first network data rate test is successful. If so, the process 700 continues to step 745. If not, the process 700 continues to step 750 of FIG. 7B.

In step 745, if the first network data rate test is successful, the computing device adjusts an operating network data rate to the first network data rate. After step 745, the process 700 ends.

As shown in FIG. 7B, in step 750, if the first network data rate test fails, the computing device measures a goodput rate during the first network data rate test.

In step 760, the computing device runs a second network data rate test at the goodput rate.

In step 770, the computing device determines whether the second network data rate test is successful. If so, the process 700 continues to step 775. If not, the process 700 continues to step 780.

In step 775, if the second network data rate test is successful, the computing device adjusts the operating network data rate to the goodput rate. After step 775, the process 700 ends.

In step 780, if the second network data rate test fails, the computing device gradually increases the operating network data rate starting from a network data rate being implemented during the emergency operation mode. In some examples, one network data rate implemented during the normal operation mode is at least twice one network data rate implemented during the emergency operation mode.

In some examples, the computing device determines, based on network metrics, that the computing device is able to return from the emergency operation mode to the normal operation mode in a first direction of network traffic (e.g., inbound to the computing device) but not in a second direction of network traffic (e.g., outbound from the computing device). In these circumstances, the computing device can return to the normal operation mode for traffic in the first direction while maintaining the emergency mode for traffic in the second direction. In these circumstances, the computing device can skip steps 730-775 in the process 700 and gradually increase the operating network data rate in the first direction starting from the network data rate being implemented during the emergency operation mode. The first network data rate test (e.g., step 730) and the second network data rate test (e.g., step 760) can be skipped.

In some examples, the computing device foregoes transmitting, to a server external to the computing device (e.g., the servers 440, 450, or 460) an indication of the operation mode (e.g., emergency operation mode) of the computing device. However, the computing device can transmit to the server an indication of the operating network data rate for data transmitted from the server to the computing device (e.g., data transmitted from the server to the computing device in the stream associated with the server), which is determined at the computing device. The operating network data rate for data transmitted from the server to the computing device can then be enforced either at the server or at the computing device. After step 780, the process 700 ends.

According to some examples, the bandwidth management system includes two main components: estimation (e.g., determining how much bandwidth is available at any given time) and allocation (e.g., determining how the available bandwidth may be partitioned between the active media streams).

The bandwidth algorithms are executed at the client computing device, or endpoint. The endpoint makes all bandwidth-related decisions for both upstream and downstream directions and accordingly instructs the various servers. In some cases, there is no direct communication or coordination between the servers for bandwidth management purposes.

The endpoint can estimate its upstream and downstream bandwidth to one server and assumes that the estimate holds for all servers. Since the endpoint typically runs in limited capacity user networks, while the servers are typically located in high capacity data centers, the bandwidth bottleneck is typically near the endpoint and common between the paths to all servers. Therefore, estimating the bandwidth to any one server is sufficient in most cases. One side benefit of this technique is that only one server needs to provide bandwidth management support to the endpoint.

One goal of bandwidth estimation is to determine how much bandwidth is available at any given time.

The estimation process can include a short initial estimation step that provides a quick-and-rough estimate of the network bandwidth.

After the initial estimation step, the estimation algorithm can operate in one of two modes: 'Normal' (which indicates that the network is in its normal state) and 'Emergency' (which indicates that the network is in an 'abnormal' state, such as when there is heavy cross traffic). The mode of operation at any given time can be selected based on observed values of network metrics (packet loss and delay).

In normal mode, the algorithm runs periodic 'rate tests' to test the available bandwidth. In each rate test, the algorithm slightly increases the data rate on the wire and observes metrics to determine whether the rate increase was successful.

On transitioning to Emergency mode, the algorithm cuts the data rate on the wire by half to make room for cross traffic. After that, the algorithm, in some cases makes no further changes to its data rate unless it observes heavy packet loss. In some cases, the algorithm no longer pays any attention to delay in this mode, helping deal with transmission control protocol (TCP) based cross traffic.

One goal of bandwidth allocation is to partition the available bandwidth (as reported by the estimation algorithm) among the active traffic streams (e.g., audio, video, or screen sharing). The allocator typically utilizes only a portion of the estimated bandwidth (e.g., 80%) and leaves some bandwidth (e.g., 20%) unused to absorb transient cross traffic.

On being activated, each stream may register with the bandwidth allocator. As part of its registration profile, the stream specifies a minimum bandwidth requirement. The minimum bandwidth requirement can be met at all times. (The sum of all minimum requirements can correspond to the minimum bandwidth requirement for the communication application to operate.

In some cases, the stream profile indicates whether the stream's bandwidth consumption is typically bursty, variable bitrate, or constant bitrate, along with the maximum bandwidth that the stream can consume.

Throughout its lifetime, each stream expresses a current bandwidth demand to the allocator. In some cases, the current bandwidth is greater than or equal to the minimum bandwidth and less than or equal to the maximum bandwidth specified in the profile. For the audio stream (e.g., voice over Internet protocol stream), the current demand is static and equal to the minimum requirement. For the video and screen sharing streams, the demand changes with activity on the stream.

In some examples, the allocation algorithm operates as follows. The allocation algorithm grants every active stream its minimum requirement, satisfying the audio stream, as, in some cases the demand of the audio stream is never higher than the minimum requirement of the audio stream. If any bandwidth remains after the minimums have been met, the remaining bandwidth is proportioned between screen sharing and video streams. If there is no screen sharing activity currently, then the surplus bandwidth can be assigned to the video stream. If the screen sharing stream has ongoing activity, then the screen sharing stream can be given a portion of the surplus bandwidth, depending on its demand. The remaining bandwidth can be allocated to the video stream.

In some examples, the subject technology relates to Intelligently determining when to enable, partially enable, or disable bandwidth management. In some cases, bandwidth is explicitly managed at all times, regardless of the active stream set, in order to ensure an optimal experience at the available network capacity. However, in some cases, a bandwidth estimation algorithm can sometimes incorrectly estimate the capacity, leading to a negative performance impact, particularly in scenarios where the network capacity is significantly under-estimated and traffic streams are artificially restricted to the low estimated bandwidth. There are both advantages and disadvantages to bandwidth management. Whether the advantages outweigh the disadvantages, or vice versa, depends on the properties of the streams that are active.

In some examples, the bandwidth management algorithm disclosed herein takes this into account and smartly enables, disables, or partially enables itself. As various streams become active or inactive within the session, the status of bandwidth management can change.

For example, when a video stream is active, the advantages of explicitly managing bandwidth may outweigh the disadvantages. A video stream typically has a large bandwidth range of operation. To get the best experience, giving the stream as much bandwidth as possible without congesting the network may be desirable. As a result, bandwidth management can be used when a video stream is active.

When only audio and screen sharing streams are active, there may be an advantage to explicitly managing bandwidth, as the bandwidth consumption of screen sharing bursts is more controlled and does not cause any interference to the audio stream. However, if the bandwidth is underestimated, a significant negative impact on screen sharing responsiveness can be caused, leading to a poor user experience, particularly in high capacity networks. Thus, disabling bandwidth management in such scenarios may be desirable, trading possible brief audio interruptions for fast screen sharing. Optionally, in some cases, the subject technology does not enable the bandwidth management system when only audio and screen sharing are active.

When video, audio and screen sharing are all active on a low capacity network, the subject technology can, in some cases, manage bandwidth while making certain modifications to improve screen sharing performance. For example, the allocator can use a higher fraction of the available bandwidth (e.g., 95% instead of 80%). In some cases, at first, the screen sharing stream is granted 50% of the surplus bandwidth (after the minimum requirements of all streams have been met), with the remaining 50% given to video. However, if the screen sharing activity persists for over a threshold time period (e.g., 2 seconds), the grant is increased to 85% of the surplus bandwidth, with only 15% given to video. The percentages above are examples and can be replaced with other threshold(s).

In some cases, a 'floor' (e.g., 350 kilobits per second) can be applied to the grant to the screen sharing stream, regardless of the available bandwidth. This potentially grants the screen sharing stream more bandwidth than what is available and compels TCP to handle the congestion control within the network. However, as a result, video quality may be reduced when the screen sharing burst is active. This trade-off (faster screen sharing for reduced video quality) can result in the best overall user experience on low capacity networks. Bandwidth management may be partially disabled for the screen sharing stream.

During emergency mode, the bandwidth estimation algorithm cuts the data rate by a fraction (e.g., half or more). When metrics indicate that the network state has returned to normal, the algorithm can switch back to the normal mode. At this time, the algorithm first does a rate test at the pre-emergency rate. If this test succeeds, a quick return to the pre-emergency performance is done. If the rate test fails, the algorithm measures the goodput during the failed test (which may be lower than the attempted rate). The algorithm then attempts another rate test at the goodput rate. If this test succeeds, quicker convergence to the new state of the network can result. If the goodput rate test also fails, the algorithm falls back to a 'slow ramp up' strategy, where it gradually increases the rate starting at the emergency rate.

If one other direction (e.g., upstream for downstream estimation and vice versa) is still in emergency mode, the algorithm can, according to some implementations, skip the fast recovery and directly attempts slow ramp-up. According to some examples, this extra caution can be exercised since metric delivery can be adversely affected by the emergency conditions in the opposite direction.

Figure 8:
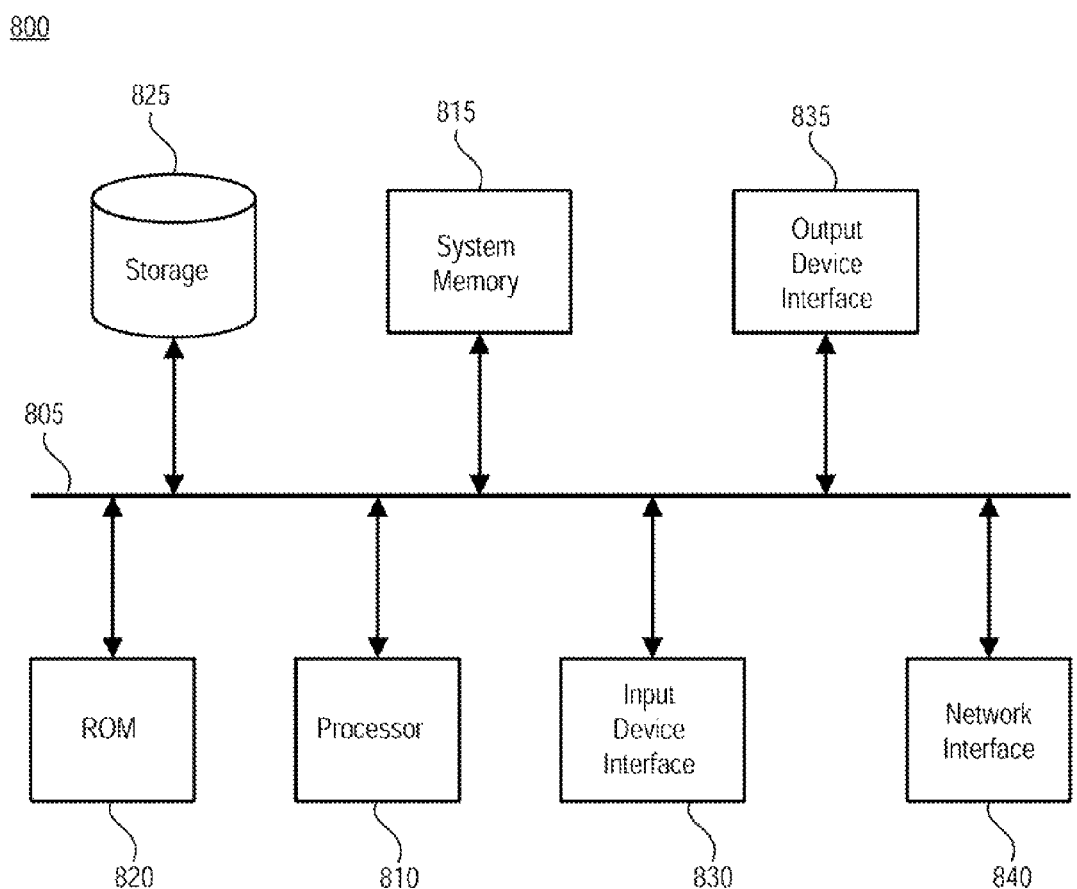
FIG. 8 conceptually illustrates an example electronic system with which some implementations of the subject technology are implemented.

FIG. 8 conceptually illustrates an electronic system 800 with which some implementations of the subject technology are implemented. For example, one or more of the communications devices 120A and 120B, the communications server 150, the audio bridge 160, the video server 170, the client computing device 410, the audio communication server 440, the video communication server 450, or the screen sharing server 460 may be implemented using the arrangement of the electronic system 800. The electronic system 800 can be a computer (e.g., a mobile phone, PDA), or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, an input device interface 830, an output device interface 835, and a network interface 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some implementations of the subject technology use a mass-storage device (for example a magnetic or optical disk and its corresponding disk drive) as the permanent storage device 825.

Other implementations use a removable storage device (for example a floppy disk, flash drive, and its corresponding disk drive) as the permanent storage device 825. Like the permanent storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the processes of the subject technology are stored in the system memory 815, the permanent storage device 825, or the read-only memory 820. For example, the various memory units include instructions for bandwidth allocation and estimation in accordance with some implementations. From these various memory units, the processing unit(s) 810 retrieves instructions to execute and data to process in order to execute the processes of some implementations.

The bus 805 also connects to the input and output device interfaces 830 and 835. The input device interface 830 enables the user to communicate information and select commands to the electronic system. Input devices used with input device interface 830 include, for example, alphanumeric keyboards and pointing devices (also called "cursor control devices"). Output device interfaces 835 enables, for example, the display of images generated by the electronic system 800. Output devices used with output device interface 835 include, for example, printers and display devices, for example cathode ray tubes (CRT) or liquid crystal displays (LCD). Some implementations include devices for example a touch screen that functions as both input and output devices.

Finally, as shown in FIG. 8, bus 805 also couples electronic system 800 to a network (not shown) through a network interface 840. In this manner, the electronic system 800 can be a part of a network of computers (for example a local area network ("LAN"), a wide area network ("WAN"), or an Intranet, or a network of networks, for example the Internet. Any or all components of electronic system 800 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A non-transitory machine-readable medium for managing bandwidth utilization, the machine-readable medium storing instructions for:
    monitoring, via a communication application executing at a computing machine connected to a network, one or more network metrics, wherein the communication application is configured to run in either a normal operation mode or an emergency operation mode;
    estimating a total available bandwidth at the computing machine based on the one or more monitored network metrics;
    running the communication application in the normal operation mode at a first network data rate;
    entering an emergency operation mode based on the one or more monitored network metrics;
    determining, based on a change in the one or more monitored network metrics, that the communication application is able to return to the normal operation mode for communication in a first direction;
    entering the normal operation mode for communication in the first direction;
    running a first network data rate test at the first network data rate;
    if the first network data rate test is successful: setting a current network data rate in the first direction to the first network data rate; and
    if the first network data rate test fails:
        measuring a goodput rate during the first network data rate test;
        running a second network data rate test at the goodput rate;
        if the second network data rate test is successful: adjusting the current network data rate to the goodput rate; and
        if the second network data rate test fails: gradually increasing the current network data rate starting from a network data rate being implemented during the emergency operation mode.

2. The non-transitory machine-readable medium of claim 1, wherein the instructions for estimating the total available bandwidth at the computing machine comprise instructions for:
    computing an upstream and a downstream bandwidth between the computing machine and a first server for a first active stream based on a data transmission between the computing machine and the first server; and
    estimating that an upstream and a downstream bandwidth between the computing machine and a second server for a second active stream corresponds to the computed upstream or downstream bandwidth between the computing machine and the first server.

3. The non-transitory machine-readable medium of claim 1, wherein the instructions for entering the emergency operation mode comprise instructions for:
    setting the operating network data rate to a network data rate corresponding to the emergency operation mode;
    ignoring packet delay; and
    upon detecting packet loss rate above a second threshold amount of packet loss, further decreasing the operating network data rate.

4. The non-transitory machine-readable medium of claim 1, wherein the instructions for entering the normal operation mode comprise instructions for:
    running a network data rate test at a network data rate exceeding the current network data rate; and
    if the network data rate test at the network data rate exceeding the current network data rate is successful: increasing the current network data rate.

5. The non-transitory machine-readable medium of claim 1, the machine-readable medium further storing instructions for:
    determining, based on the estimated total available bandwidth or the one or more monitored network metrics, that the communication application is unable to return to the normal operation mode for communication in a second direction, wherein the first direction is a first one of inbound to the computing machine or outbound from the computing machine, and wherein the second direction is a different, second one of inbound to the computing machine or outbound from the computing machine;

maintaining the emergency operation mode for communication in the second direction; and gradually increasing the current network data rate for communication in the first direction starting from a network data rate being implemented during the emergency operation mode, while maintaining the current network data rate for communication in the second direction at the network data rate being implemented during the emergency operation mode.

6. The non-transitory machine-readable medium of claim 1, the machine-readable medium further storing instructions for:

foregoing transmitting, to a server associated with an active stream external to the computing machine, an indication of the operation mode of the communication application; and transmitting, to the server associated with the active stream, an indication of the current network data rate for data transmission in the active stream from the server to the computing machine.

7. The non-transitory machine-readable medium of claim 1, wherein the monitored one or more network metrics comprise one or more of a packet loss rate, a packet delay rate, or a network goodput rate.

8. A system for managing bandwidth utilization, the system comprising:

one or more processors;
a network interface for connecting to a network; and
a memory storing instructions for:
  monitoring, via a communication application executing via the one or more processors, one or more network metrics,
  wherein the communication application is configured to run in either a normal operation mode or an emergency operation mode;
  estimating a total available bandwidth in the network based on the one or more monitored network metrics;
  running the communication application in the normal operation mode at a first network data rate;
  entering an emergency operation mode based on the one or more monitored network metrics;
  determining, based on a change in the one or more monitored network metrics, that the communication application is able to return to the normal operation mode for communication in a first direction;
  entering the normal operation mode for communication in the first direction;
  running a first network data rate test at the first network data rate;
  if the first network data rate test is successful: setting a current network data rate in the first direction to the first network data rate; and
  if the first network data rate test fails:
    measuring a goodput rate during the first network data rate test;
    running a second network data rate test at the goodput rate;
    if the second network data rate test is successful: adjusting the current network data rate to the goodput rate; and
    if the second network data rate test fails: gradually increasing the current network data rate starting from a network data rate being implemented during the emergency operation mode.

9. The system of claim 8, wherein the instructions for estimating the total available bandwidth in the network comprise instructions for:

computing an upstream and a downstream bandwidth between the network interface and a first server for a first active stream based on a data transmission between the network interface and the first server; and estimating that an upstream and a downstream bandwidth between the network interface and a second server for a second active stream corresponds to the computed upstream or downstream bandwidth between the network interface and the first server.

10. The system of claim 8, wherein the instructions for entering the emergency operation mode comprise instructions for:

setting the operating network data rate to a network data rate corresponding to the emergency operation mode;
ignoring packet delay; and
upon detecting packet loss rate above a second threshold amount of packet loss, further decreasing the operating network data rate.

11. The system of claim 8, wherein the instructions for entering the normal operation mode comprise instructions for:

running a network data rate test at a network data rate exceeding the current network data rate; and
if the network data rate test at the network data rate exceeding the current network data rate is successful: increasing the current network data rate.

12. The system of claim 8, the memory further storing instructions for:

determining, based on the estimated total available bandwidth or the one or more monitored network metrics, that the communication application is unable to return to the normal operation mode for communication in a second direction, wherein the first direction is a first one of inbound to the network interface or outbound from the network interface, and wherein the second direction is a different, second one of inbound to the computing machine or outbound from the computing machine;

maintaining the emergency operation mode for communication in the second direction; and gradually increasing the current network data rate for communication in the first direction starting from a network data rate being implemented during the emergency operation mode, while maintaining the current network data rate for communication in the second direction at the network data rate being implemented during the emergency operation mode.

13. The system of claim 8, the memory further storing instructions for:

foregoing transmitting, to a server associated with an active stream, an indication of the operation mode of the communication application; and transmitting, to the server associated with the active stream, an indication of the current network data rate for data transmission in the active stream from the server to the network interface.

14. The system of claim 8, wherein the monitored one or more network metrics comprise one or more of a packet loss rate, a packet delay rate, or a network goodput rate.

15. A method of managing bandwidth utilization, comprising:
    monitoring, via a communication application executing at a computing machine connected to a network, one or more network metrics, wherein the communication application is configured to run in either a normal operation mode or an emergency operation mode;
    estimating a total available bandwidth at the computing machine based on the one or more monitored network metrics;
    running the communication application in the normal operation mode at a first network data rate;
    entering an emergency operation mode based on the one or more monitored network metrics;
    determining, based on a change in the one or more monitored network metrics, that the communication application is able to return to the normal operation mode for communication in a first direction;
    entering the normal operation mode for communication in the first direction;
    running a first network data rate test at the first network data rate;
    if the first network data rate test is successful: setting a current network data rate in the first direction to the first network data rate; and
    if the first network data rate test fails:
        measuring a goodput rate during the first network data rate test;
        running a second network data rate test at the goodput rate;
        if the second network data rate test is successful: adjusting the current network data rate to the goodput rate; and
        if the second network data rate test fails: gradually increasing the current network data rate starting from a network data rate being implemented during the emergency operation mode.

16. The method of claim 15, wherein estimating the total available bandwidth at the computing machine further comprises:
    computing an upstream and a downstream bandwidth between the computing machine and a first server for a first active stream based on a data transmission between the computing machine and the first server; and
    estimating that an upstream and a downstream bandwidth between the computing machine and a second server for a second active stream corresponds to the computed upstream or downstream bandwidth between the computing machine and the first server.

17. The method of claim 15, wherein entering the emergency operation mode further comprises:
    setting the operating network data rate to a network data rate corresponding to the emergency operation mode;
    ignoring packet delay; and
    upon detecting packet loss rate above a second threshold amount of packet loss, further decreasing the operating network data rate.

18. The method of claim 15, wherein entering the normal operation mode further comprises:
    running a network data rate test at a network data rate exceeding the current network data rate; and
    if the network data rate test at the network data rate exceeding the current network data rate is successful: increasing the current network data rate.

19. The method of claim 15, further comprising:
    determining, based on the estimated total available bandwidth or the one or more monitored network metrics, that the communication application is unable to return to the normal operation mode for communication in a second direction, wherein the first direction is a first one of inbound to the computing machine or outbound from the computing machine, and wherein the second direction is a different, second one of inbound to the computing machine or outbound from the computing machine;
    maintaining the emergency operation mode for communication in the second direction; and
    gradually increasing the current network data rate for communication in the first direction starting from a network data rate being implemented during the emergency operation mode, while maintaining the current network data rate for communication in the second direction at the network data rate being implemented during the emergency operation mode.

20. The method of claim 15, further comprising:
    foregoing transmitting, to a server associated with an active stream external to the computing machine, an indication of the operation mode of the communication application; and
    transmitting, to the server associated with the active stream, an indication of the current network data rate for data transmission in the active stream from the server to the computing machine.

21. The method of claim 1, wherein the monitored one or more network metrics comprise one or more of a packet loss rate, a packet delay rate, or a network goodput rate.

* * * * *